United States Patent
Brown et al.

(10) Patent No.: US 7,523,302 B1
(45) Date of Patent: Apr. 21, 2009

(54) ELECTRONIC RECIPE MANAGEMENT

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/560,321

(22) Filed: Apr. 28, 2000

(51) Int. Cl.
| | |
|---|---|
| G06F 11/30 | (2006.01) |
| G06F 12/14 | (2006.01) |
| H04L 9/00 | (2006.01) |
| H04L 9/32 | (2006.01) |
| H04N 7/167 | (2006.01) |
| G06Q 30/00 | (2006.01) |
| G06Q 50/00 | (2006.01) |
| G06Q 20/00 | (2006.01) |
| G06F 17/30 | (2006.01) |
| G06F 7/00 | (2006.01) |
| H04K 1/00 | (2006.01) |

(52) U.S. Cl. ............... 713/155; 713/156; 713/173; 705/15; 705/18; 705/26; 705/27; 705/51; 705/53; 705/57; 705/76; 705/77; 708/133; 380/201

(58) Field of Classification Search .......... 705/26, 705/27, 77, 76, 15, 57, 18, 51, 53; 380/201; 713/201, 200, 155, 156, 173; 708/133
See application file for complete search history.

(56) References Cited

U.S. PATENT DOCUMENTS

| | | | |
|---|---|---|---|
| 4,882,724 A | 11/1989 | Vela et al. | |
| 4,992,940 A | 2/1991 | Dworkin | |
| 5,047,614 A | 9/1991 | Bianco | |
| 5,091,713 A | 2/1992 | Horne et al. | |
| 5,392,351 A * | 2/1995 | Hasebe et al. | 705/51 |
| 5,691,684 A | 11/1997 | Murrah | |
| 5,798,694 A | 8/1998 | Reber et al. | |
| 5,832,446 A * | 11/1998 | Neuhaus | 705/1 |
| 5,969,606 A | 10/1999 | Reber et al. | |
| 5,983,200 A | 11/1999 | Slotznick | |
| 6,023,683 A | 2/2000 | Johnson et al. | |
| 6,047,265 A * | 4/2000 | Sugimori | 705/26 |
| 6,204,763 B1 | 3/2001 | Sone | |
| 6,226,618 B1 * | 5/2001 | Downs et al. | 705/1 |
| 6,341,271 B1 | 1/2002 | Salvo et al. | |
| 6,392,668 B1 * | 5/2002 | Murray | 345/738 |

(Continued)

FOREIGN PATENT DOCUMENTS

JP 11066170 A * 3/1999

(Continued)

*Primary Examiner*—Shin-Hon Chen
(74) *Attorney, Agent, or Firm*—Dillon & Yudell, LLP

(57) ABSTRACT

In accordance with the present invention, ingredients for a particular electronic recipe accessible at a particular web site are encrypted, wherein the encrypted ingredients may be decrypted by a food retailer that intends to pre-package the encrypted ingredients. Instructions for preparing the electronic recipe and the encrypted ingredients are transmitted to a computer system associated with a particular user. The particular user may select the food retailer at which the encrypted ingredients are to be pre-packaged and transmit the encrypted ingredients to the food retailer. The selected food retailer may decrypt the encrypted ingredients utilizing a decryption key provided by the particular web site and pre-package the encrypted ingredients for the particular user.

43 Claims, 5 Drawing Sheets

U.S. PATENT DOCUMENTS

| | | |
|---|---|---|
| 6,418,416 B1 | 7/2002 | Rosenberg et al. |
| 6,430,541 B1 | 8/2002 | Brown et al. |
| 6,539,380 B1 * | 3/2003 | Moran ............................ 707/9 |
| 6,549,818 B1 * | 4/2003 | Ali ............................... 700/90 |
| 2002/0003166 A1 * | 1/2002 | Miller et al. ........... 235/462.13 |
| 2002/0026363 A1 * | 2/2002 | Dunaway, Jr. ................. 705/15 |
| 2002/0042891 A1 * | 4/2002 | Garney et al. ............... 713/600 |

FOREIGN PATENT DOCUMENTS

| | | | |
|---|---|---|---|
| WO | WO 9820641 A1 * | 5/1998 | |

* cited by examiner

ELECTRONIC RECIPE MANAGEMENT

CROSS-REFERENCE TO RELATED APPLICATIONS

The present application is related to the following copending applications, which are filed on even date herewith and incorporated herein by reference:
(1) U.S. patent application Ser. No. 09/560,386; and
(2) U.S. patent application Ser. No. 09/560,319.

BACKGROUND OF THE INVENTION

1. Technical Field

The present invention relates in general to electronic recipes and, in particular, to a method, system, and program for managing electronic recipes. Still more particularly, the present invention relates to a method, system and program for distributing electronic recipes with encrypted ingredient lists that are only accessible by a food retailer.

2. Description of the Related Art

Food recipes have been swapped, published and handed down by word of mouth, written recipe cards, published recipes and other media for years. Today, recipes are also permeated through electronic media. Many web sites provide databases of recipes that can be searched by ingredients and other criteria. In addition, many electronic recipe web sites enable users to upload recipes that can then be accessed by other users.

Professional chefs and restaurants that develop award-winning dishes may attempt to profit from recipes for the dishes not only by preparing the dishes in a restaurant, but by publishing recipe books. However, distribution of recipes, once they are in print, is difficult to stop. Even more difficult, once a recipe is in electronic format, the recipe can be distributed to millions of users.

Some restaurants are able to secure portions of recipes and profit from the creation of award-winning dishes by distributing sauces or other pre-packaged portions of a dish so that the purchaser may only add a few additional ingredients and/or cooking preparation. In addition, pre-packaging ingredients for a particular dish has become popular in some supermarkets. For example, a consumer may purchase a package of chopped vegetables and a spice pack for preparing a soup. The pre-packaged ingredients also include instructions for preparation and options for meats and other ingredients that may be added.

While supermarkets and other food retailers may distribute their own recipes with pre-packaged ingredients, it would be advantageous to provide electronic recipes that may be distributed from a web site and include "protected" ingredients that can be accessed and prepared by a supermarket or other food retailer, however are not accessible to the consumer other than by purchase from the supermarket or other food retailer.

SUMMARY OF THE INVENTION

In view of the foregoing, it is therefore an object of the present invention to provide an improved method, system and program for distributing electronic recipes.

It is yet another object of the present invention to provide an improved method, system and program for distributing electronic recipes with encrypted ingredient lists that are only accessible by a food retailer.

In accordance with the present invention, ingredients for a particular electronic recipe accessible at a particular web site are encrypted, wherein the encrypted ingredients may be decrypted by a food retailer that intends to pre-package the encrypted ingredients. Instructions for preparing the electronic recipe and the encrypted ingredients are transmitted to a computer system associated with a particular user. The particular user may select the food retailer at which the encrypted ingredients are to be pre-packaged and transmit the encrypted ingredients to the food retailer. The selected food retailer may decrypt the encrypted ingredients utilizing a decryption key provided by the particular web site and pre-package the encrypted ingredients for the particular user.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention may be executed in a variety of systems, including a variety of computing systems and electronic devices under a number of different operating systems. In a preferred embodiment of the present invention, the computer system incorporates communication features that provide for telephony, enhanced telephony, messaging and information services. Preferably, in order to enable at least one of these communication features, the computer system is able to be connected to a network, such as the Internet by either a wired link or wireless link. In addition, the computer system may be a stand-alone system or part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
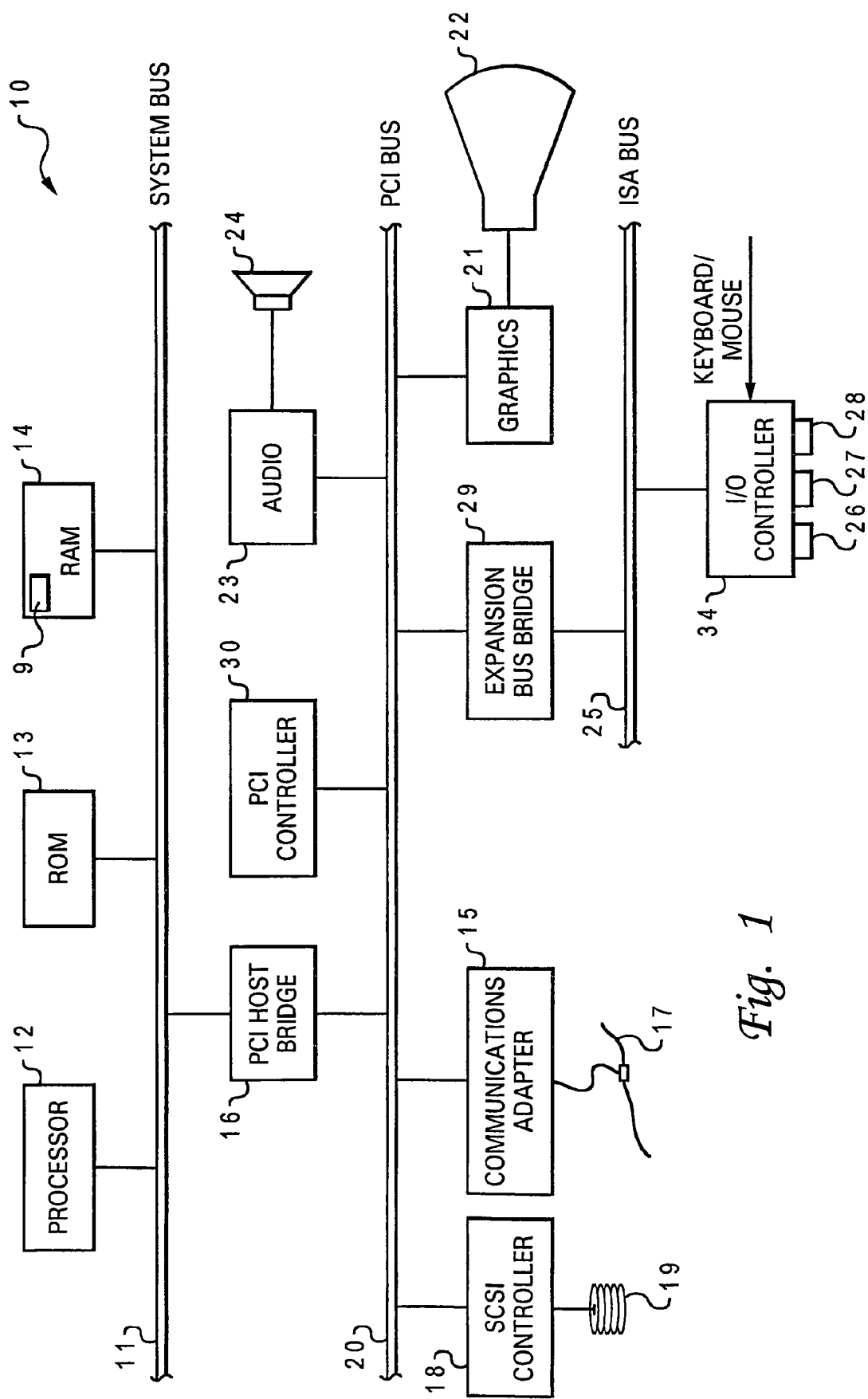
FIG. 1 depicts one embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 3, 4, 5 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
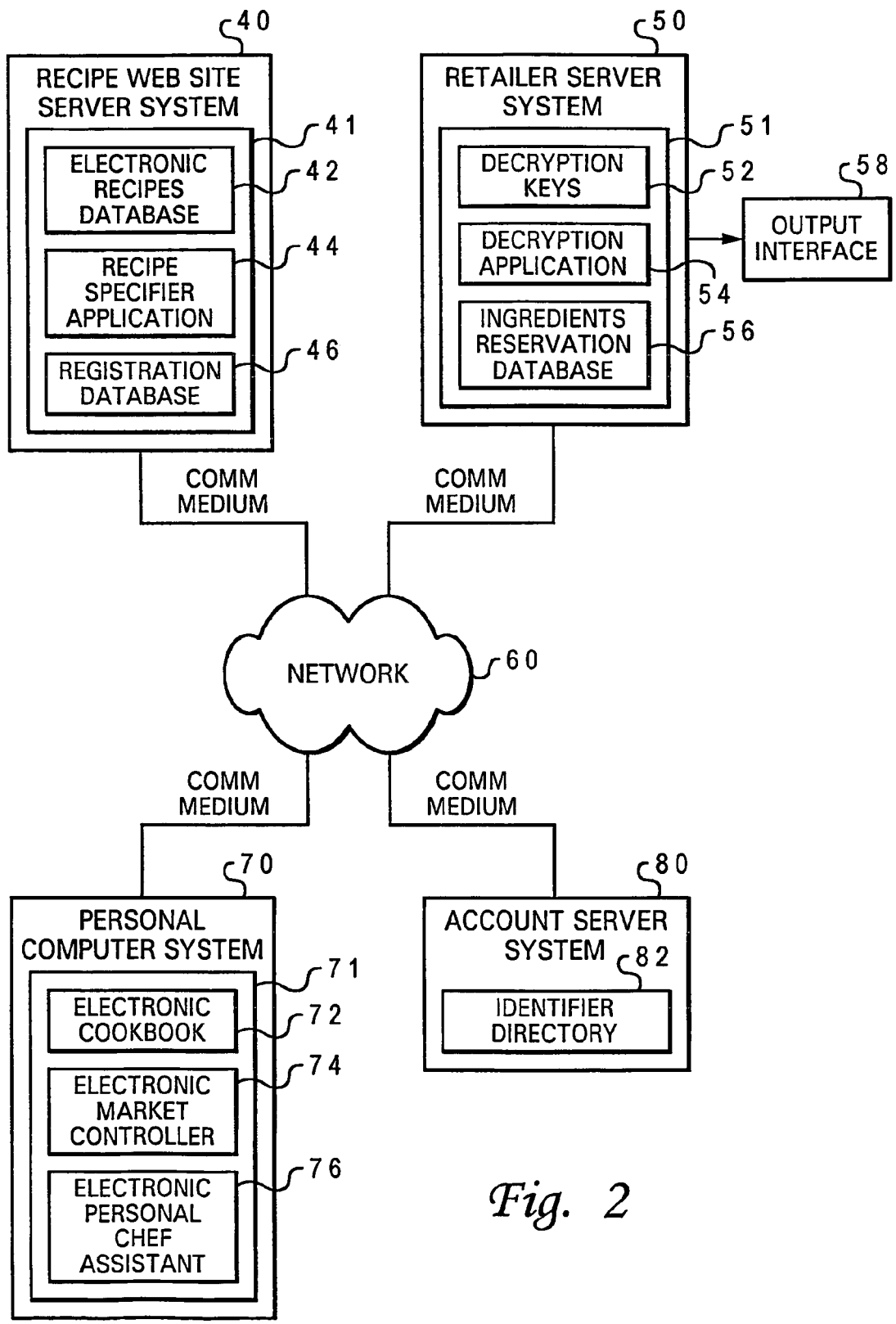
FIG. 2 illustrates one embodiment of a block diagram of an electronic recipe distribution management system in accordance with the method, system, and program of the present invention.

With reference now to FIG. 2, there is illustrated one embodiment of a block diagram of an electronic recipe distribution management system in accordance with the method, system, and program of the present invention. As depicted, recipe web site server system 40, food retailer server system 50, personal computer system 70 and account server system 80 communicate via a communication medium with a network 60, such as the Internet. The communication medium may include wired or wireless communications or other communications media that enables bi-directional transmission of data.

Data exchange across the communication medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from recipe web site server system 40 to personal computer system 70, as depicted below, preferably contains data that is distinguished by attributes on elements and may be wrappered within a larger element. For example, the data attributed to element "<TimeStamp></TimeStamp>" designates the time that the data was attributed to the XML data file.

<RECIPE TimeStamp="888965153" ServerID="jazzfood34" Instructions="cobblerinstr.doc">

Ingredients="jazzfood34ingred.doc">

A second example of the same data in an alternate XML data format that includes elements is illustrated below.

<TimeStamp>888965153</TimeStamp>
<ServerID>jazzfood34</ServerID>
<Instructions>cobblerinstr.doc</Instructions>
<Ingredients>jazzfood34ingred.doc</Ingredients>

In the example, an electronic recipe for a cobbler is transmitted from a recipe web site server system with a universal identifier of "jazzfood34". The electronic recipe includes a first part of instructions included in "cobblerinstr.doc" and a second part of ingredients that are encrypted in "jazzfood34ingred.doc".

In addition, in the example of the XML data format as the common transmittable data format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for an electronic food recipe is included in the XML data file.

Account server system 80 serves as a universally accessible database that advantageously includes an identifier directory 82 of server system addresses each associated with one of multiple universal identifiers. In order to access any of the server systems and other data processing systems accessible via network 60, an alphanumeric universal identifier, such as a web page address, associated with a person, item, group or business, is preferably looked up in identifier directory 82 and utilized to determine the server system address associated with the universal identifier. In the present example, each of recipe web site server system 40, retailer server system 50 and personal computer system 70 may be accessed according to universal identifiers associated with recipe web site server system 40, retailer server system 50, and personal computer system 70.

Account server system 80 may be housed within a single server system or multiple distributed server systems and identifier directory 82 may include server addresses for multiple types of systems including, but not limited to, web application servers, host storage systems, mainframes, and home computer systems.

Personal computer system 70 includes an electronic cookbook 72, an electronic market controller 74, and an electronic personal chef assistant within a data storage medium 71. While in the present embodiment, data storage medium 71 is depicted as internally accessible to personal computer system 70, in alternate embodiments, data storage medium 71 may be externally or remotely accessible to personal computer system 70.

Electronic cookbook 72 advantageously includes menu plans for a particular household. U.S. patent application Ser. No. 09/560,386, herein incorporated by reference, includes a description of the method, system and program for managing menu plans by electronic cookbook 72. Menu plans are advantageously made according to multiple factors including dietary and health related data for multiple occupants and visitors to a household, current food and kitchen supply inventory and time constraints according to the schedule of the primary chef of the household.

In the present invention, recipe web sites, such as recipe web site server system 40, may be searched according to the multiple factors utilized by electronic cookbook 72 to select recipes for meal plans that satisfy the multiple factors. In addition, in the present invention, a recipe that includes encrypted ingredients may be selected by electronic cookbook 72 and requested from recipe web site server system 40. Recipes that include encrypted ingredients that are accessed by personal computer system 70 are advantageously stored in electronic cookbook 72 according to a particular schedule for preparing the meal plan that includes the recipe.

Electronic market controller 74 advantageously includes universal identifiers for multiple on-line and store-front food retailers that are preferred by the household. U.S. patent application Ser. No. 09/560,319, herein incorporated by reference, includes a description of the method, system and program for managing searches for food retailers that are enabled to provide requested food items and for placing orders for food items with the food retailers according to menu plans made in electronic cookbook 72.

In the present invention, in searching for food retailers that are enabled to provide requested food items, electronic market controller 74 searches for food retailers that are enabled to provide pre-packaged ingredients from encrypted recipes. In addition market controller 74 controls the transmittal of the encrypted ingredients to a particular food retailer such that the pre-packaged ingredients will be shipped to the household or available for pick-up according to the schedule for the meal plan included in electronic cookbook 72.

Instructions for preparing a food dish according to the electronic recipe are advantageously convertible into a control signal for a cooking device by an electronic personal chef assistant 76, such as the electronic personal chef assistant described in U.S. patent application Ser. No. 09/560,388, herein incorporated by reference. In the present invention, the instructions received from the web site for the particular electronic recipe are advantageously specified according to the type of cooking device and other cooking preferences by the occupants of a household who will partake of the food dish. The specified instructions are then transmitted to the cooking device as a control signal.

Recipe web site server system 40 advantageously includes an electronic recipes database 42, recipe specifier application 44, and a registration database 46 within a data storage medium 41. While in the present embodiment data storage medium 41 is depicted as internally accessible to recipe web site server system 40, in alternate embodiments of the present invention data storage medium 41 may be externally or remotely accessible to recipe web site server system 40.

Electronic recipes database 42 advantageously includes multiple electronic recipes that are searchable according to ingredients and other criteria. In particular, in the present invention, electronic recipes may include particular ingredients that are shielded from the user, however these ingredients may be searched for according to search criteria.

Recipe specifier application 44 advantageously receives multiple factors such as dietary and health related data for multiple occupants and visitors to a household, current food and kitchen supply inventory and time constraints according to the schedule of the primary chef of the household in order to search electronic recipes database 42 for acceptable recipes for the household.

In addition, in response to receiving a selection for a particular recipe from a particular user, recipe specifier application 44 preferably utilizes the multiple factors to adjust the particular recipe. For example, the particular recipe may be adjusted by recipe specifier application 44 according to the number of servings and serving size preferences of the occupants and visitors to a household that will consume the meal prepared from the particular recipe. In another example, a particular ingredient may be substituted by recipe specifier application 44 in response to a food allergy of a particular user for an ingredient that will be encrypted from user view.

After adjusting the particular recipe according to the multiple factors, recipe specifier application 44 encrypts a particular selection of the ingredients according to the user requesting the recipe. Multiple encryption techniques may be utilized. In the present embodiment, an encryption technique, such as double-blind encryption is advantageous. In encrypting the particular selection of the ingredients utilizing double-blind encryption, a decryption key is created that may be utilized to decrypt the encrypted selection of ingredients. In the present invention, the decryption key is advantageously accessible to one of multiple allowable food retailers for decrypting the encrypted selection of ingredients and pre-packing the ingredients for a particular user.

In addition, in encrypting the particular selection of ingredients, a specified number of times for which the encrypted selection may be transmitted for pre-packaging may be secured. By one method of specifying the number of times for which the encrypted selection may be transmitted for pre-packaging, the decryption key may include an expiration date or may only be usable for decryption a specified number of times.

Recipe specifier application 44 transmits the instructions and non-encrypted ingredients with the encrypted ingredients to the requesting user system, such as personal computer system 70. In addition, recipe specifier application 44 stores the decryption key for the encrypted ingredients and may broadcast the decryption key to multiple food retailer server systems that are included in a listing of preferred food retailers for the particular user.

Registration database 46 advantageously includes registration data for multiple users and for multiple food retailers. Recipe web site server system 40 may require that a user provide registration and payment data in order to access a recipe with encrypted ingredients. Upon receiving a request for a particular recipe, if a user is not registered, an electronic registration form may be provided to the user. In response to receiving a filled in electronic registration form for the user, access to the particular recipe with encrypted ingredients may be provided. In addition, in requiring registration, recipe web site server system 40 may transmit special offers and updates on new electronic recipes according to universal identifiers of users registered in registration database 46.

In addition, recipe web site server system 40 may search registration database 46 for a registered food retailer prior to releasing decryption keys to the food retailer. Advantageously, recipe web site server system 40 may transmit an electronic registration form to the food retailer that requires the food retailer to agree to the terms provided by recipe web site server system 40 for pre-packaging ingredients. For example, terms may include that the food retailer will sell the pre-packaged ingredients at a price named by recipe web site server system 40. In another example, terms may include that the food retailer will only utilize specific brands of ingredients designated by recipe web site server system 40 in pre-packaging ingredients.

Retailer server system 50 includes decryption keys database 52, decryption application 54, and ingredients reservation database 56 within a data storage medium 51. While in the present embodiment data storage medium 51 is depicted as internally accessible to reservation server system 50, in alternate embodiments of the present invention, data storage medium 51 may be externally or remotely accessible to reservation server system 50.

Decryption keys database 52 includes decryption keys received from multiple recipe web sites. In response to receiving a search request from electronic market controller 74 of personal computer system 70 for pre-=packaging encrypted recipe ingredients from a recipe retrieved from a particular web site, decryption application 54 determines whether or not a decryption key is included in decryption key database 52 for the encrypted recipe ingredients. If a decryption key is not included, decryption application 54 also controls transmitting a request to the web site for a decryption key.

Decryption application 54 also decrypts encrypted ingredients when received from a particular user. In particular, the particular user from whom the encrypted ingredients are received must match the particular user for whom the ingredients were encrypted.

Decrypted ingredients are advantageously added to an ingredients reservation database 56 according to the particular user and output to an output interface, such as output interface 58, that is accessible to staff or machinery preparing the pre-packaged ingredients. Ingredients reservation database 56 advantageously includes a schedule for pre-packaging ingredients such that a particular time by which the ingredients will be pre-packaged may be transmitted to personal computer system 70.

In addition, ingredients reservation database 56 may update a store server system, such as the store server system described in U.S. patent application Ser. No. 09/560,317, herein incorporated by reference, that determines whether or not additional inventory should be ordered according to absent items from intended inventories of multiple households. In the present invention, the store server system might determine whether or not additional inventory should be ordered according to requests for pre-packaging ingredients.

Figure 3:
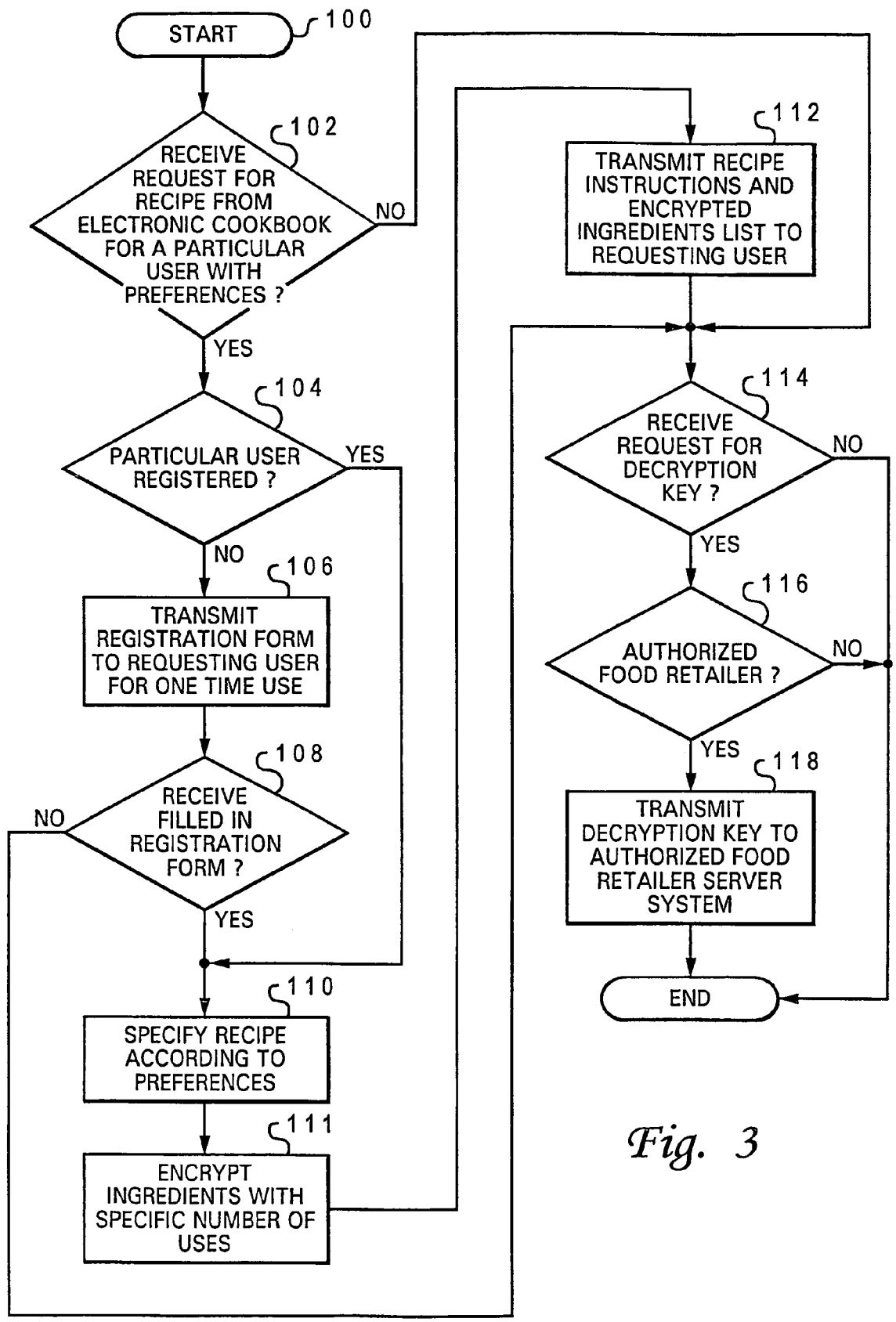
FIG. 3 depicts a high level logic flowchart of a process and program for controlling distribution of recipes from a web site in accordance with the present invention.

Referring now to FIG. 3, there is depicted a high level logic flowchart of a process and program for controlling distribution of recipes from a web site in accordance with the present invention. As illustrated, the process starts at block 100 and thereafter proceeds to block 102. Block 102 depicts a determination as to whether or not a request for a recipe is received from a particular user with particular cooking preferences. If a request for a recipe is not received, then the process passes to block 114. If a request for a recipe is received, then the process passes to block 104.

Block 104 depicts a determination as to whether or not the particular user is registered. If the particular user is registered, then the process passes to block 110. If the particular user is not registered, then the process passes to block 106.

Block 106 illustrates transmitting an electronic form to the requesting user. Next, block 108 depicts a determination as to whether or not a filled in registration form is received. If a filled in registration form is not received, then the process passes to block 114. If a filled in registration form is received, then the process passes to block 110.

Block 110 depicts adjusting the recipe according to the cooking preferences for the user. For example, in adjusting the recipe according to the cooking preferences for the user, ingredients and ingredient amounts may be adjusted in order to provide a particular number of servings and compensate for special dietary needs and food allergies. Next, block 111 illustrates encrypting the ingredients list for the particular user with a specified number of uses. The number of uses may be specified according to a number of uses paid for by the user or by other criteria. Thereafter, block 112 depicts transmitting the recipe instructions and encrypted ingredients list to the requesting user; and the process passes to block 114.

Block 114 illustrates a determination as to whether or not a request for a decryption key is received from a food retailer. If a request for a decryption key is not received, then the process ends. If a request for a decryption key is received, then the process passes to block 116. Block 116 depicts a determination as to whether or not the requesting food retailer is an authorized food retailer. If the requesting food retailer is not an authorized food retailer, then the process ends. If the requesting food retailer is an authorized food retailer, then the process passes to block 118. Block 118 illustrates transmitting a decryption key to the requesting food retailer; and the process ends. In addition, in transmitting a decryption key, the recipe web site may require that the food retailer pay for use of the decryption key and may also require that the food retailer charge a particular amount for the prepackaged ingredients, such as a per pound amount.

Figure 4:
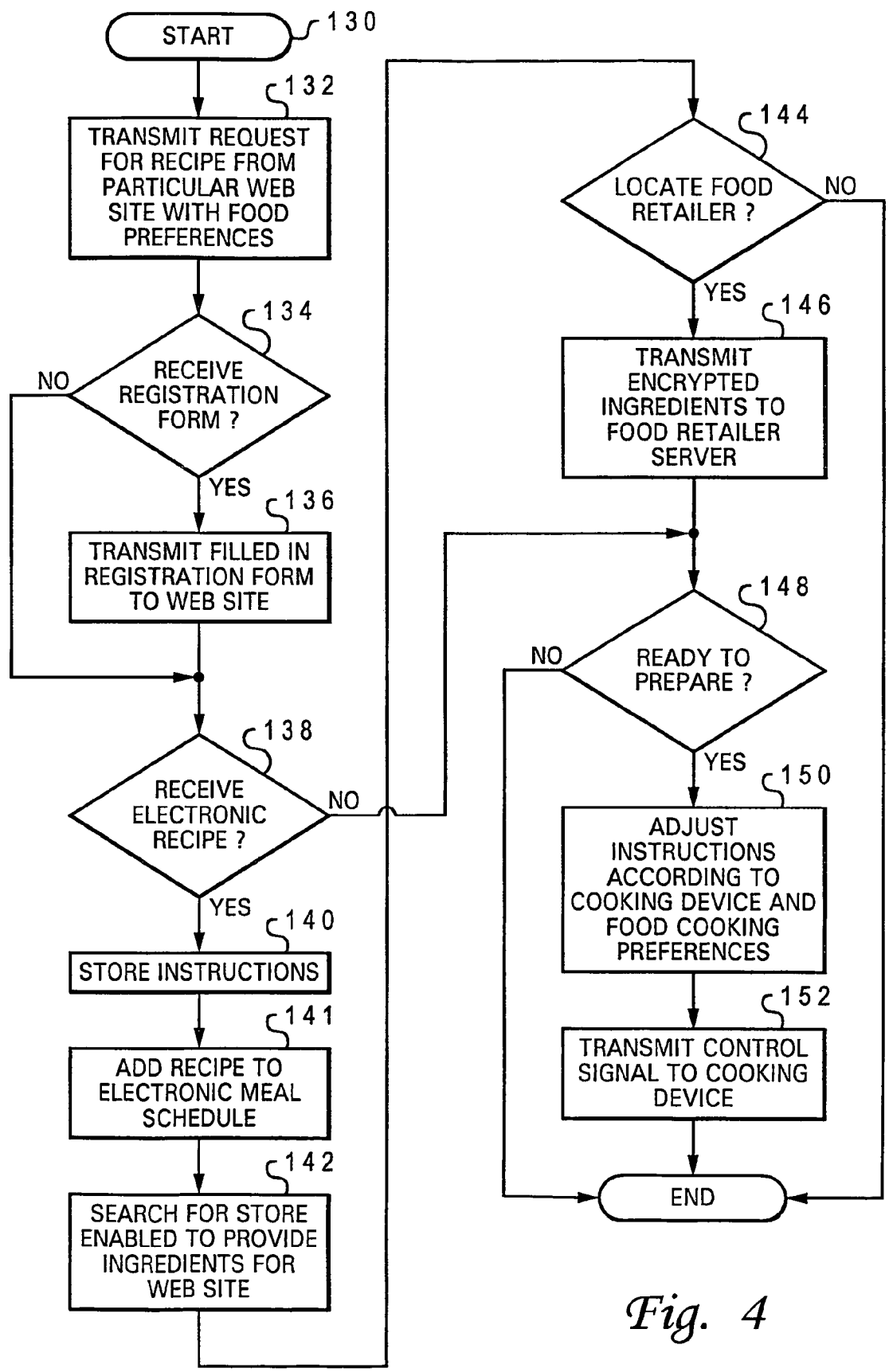
FIG. 4 illustrates a high level logic flowchart of a process and program for managing electronic recipes at an electronic cookbook for a particular user in accordance with the present invention.

With reference now to FIG. 4, there is illustrated a high level logic flowchart of a process and program for managing electronic recipes at an electronic cookbook for a particular user in accordance with the present invention. As depicted, the process starts at block 130 and thereafter proceeds to block 132. Block 132 illustrates transmitting a request for a recipe to a particular web site with food preferences for the particular user. Next, block 134 depicts a determination as to whether or not a registration form is received. If a registration form is not received, then the process passes to block 138. If a registration form is received, then the process passes to block 136.

Block 136 illustrates transmitting a filled in registration form to the web site; and the process passes to block 138. The registration form may be automatically filled in with personal data that is stored in the same data format as the electronic registration form.

Block 138 depicts a determination as to whether or not an electronic recipe is received. If an electronic recipe is not received, then the process passes to block 148. If an electronic recipe is received, then the process passes to block 140. Block 140 illustrates storing the instructions and encrypted ingredients. Next, block 141 depicts adding the recipe to an electronic meal schedule. Thereafter, block 142 depicts searching for a food retailer enabled to pre-package the ingredients from the encrypted ingredients list; and the process passes to block 144. Searching may be performed from a list of food retailers stored by the user, or via a search engine that finds on-line and store front food retailers within a particular area.

Block 144 illustrates a determination as to whether or not a food retailer that is enabled to pre-package the ingredients is located. If a food retailer is not located, then the process ends. If a food retailer is located, then the process passes to block 146. Block 146 depicts transmitting the encrypted ingredients list to the food retailer server; and the process passes to block 148. In particular, a date by which the pre-packaged ingredients are needed may also be transmitted.

Block 148 depicts a determination as to whether or not the user is ready to prepare the dish from the electronic recipe. If the user is not ready to prepare the dish, then the process ends. If the user is ready to prepare the dish, then the process passes to block 150. Block 150 illustrates adjusting the instructions according to the cooking device and any additional food cooking preferences. Next, block 152 depicts transmitting a control signal to the cooking device; and the process ends.

Figure 5:
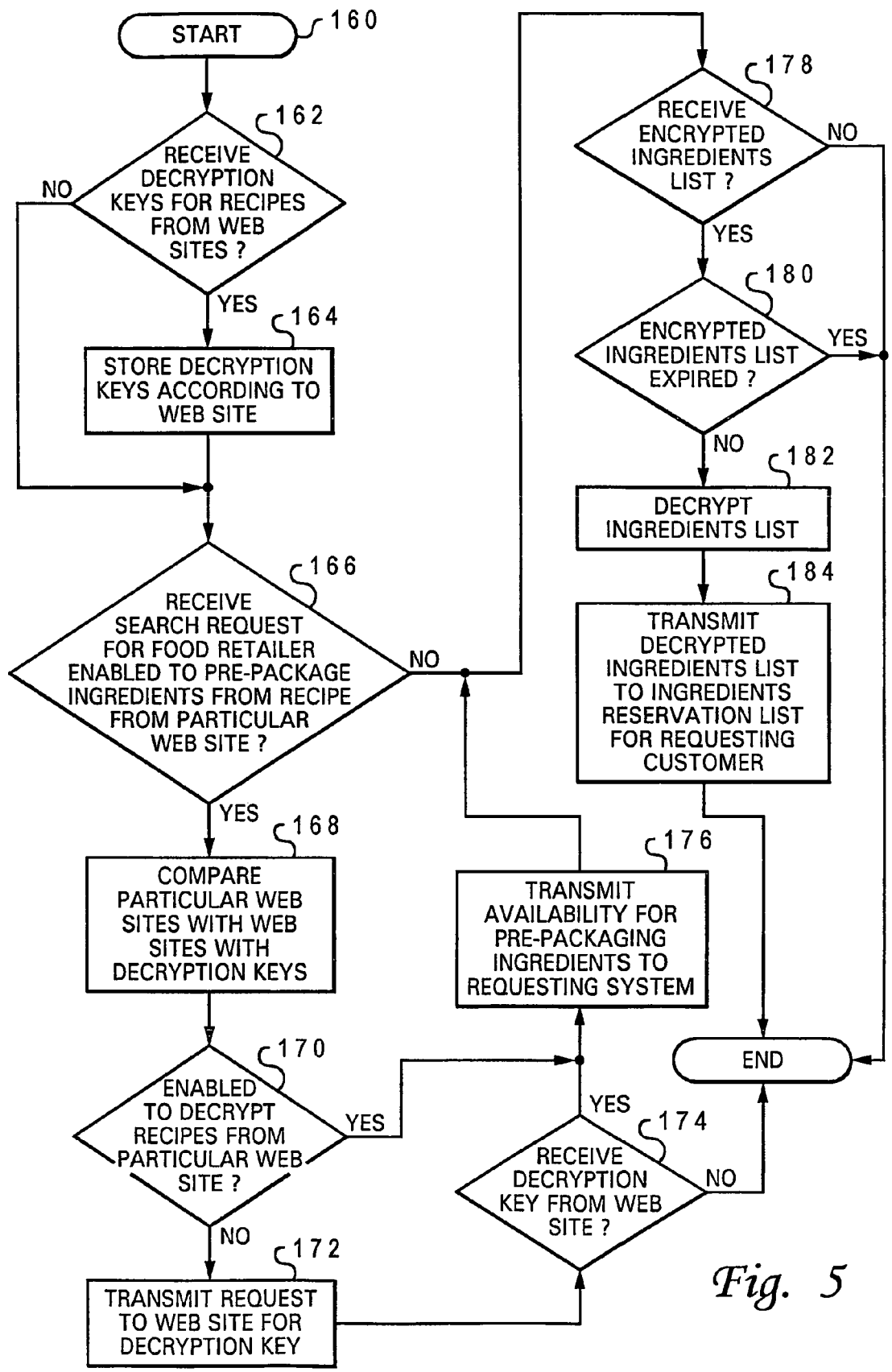
FIG. 5 depicts a high level logic flowchart of a process and program for managing prepackaging of ingredients at a food retailer in accordance with the present invention.

Referring now to FIG. 5, there is depicted a high level logic flowchart of a process and program for managing pre-packaging of ingredients at a food retailer in accordance with the present invention. As illustrated, the process starts at block 160 and thereafter proceeds to block 162. Block 162 depicts a determination as to whether or not a decryption key is received from a web site. If a decryption key is not received from a web site, the process passes to block 166. If a decryption key is received from a web site, then the process passes to block 164. Block 164 illustrates storing the decryption keys according to the web sites from which the keys are received; and the process passes to block 166.

Block 166 depicts a determination as to whether or not a search request for food retailers that can pre-package ingredients for an electronic recipe obtained from a particular web site is received from a particular user. If a search request is not received, then the process passes to block 178. If a search request is received, then the process passes to block 168.

Block 168 illustrates comparing the particular web site with the web sites from which decryption keys have been received. Next, block 170 depicts a determination as to whether or not the food retailer is enabled to decrypt recipes from the particular web site. If the food retailer is enabled to decrypt recipes from the particular web site, then the process passes to block 176. If the food retailer is not enabled to decrypt recipes from the particular web site, then the process passes to block 172.

Block 172 depicts transmitting a request to a particular web site for a decryption key for the particular recipe. Next, block 174 illustrates a determination as to whether or not a decryption key is received from the web site. If a decryption key is not received from the web site, then the process ends. If a decryption key is received from the web site, then the process passes to block 176. Block 176 depicts transmitting an indicator of availability for pre-packaging ingredients to requesting system; and the process passes to block 178.

Block 178 illustrates a determination as to whether or not an encrypted ingredients list is received. If an encrypted ingredients list is not received, then the process ends. If an encrypted ingredients list is received, then the process passes to block 180. Block 180 depicts a determination as to whether or not the encrypted ingredients list is expired. If the encrypted ingredients list is expired, then the process ends. If the encrypted ingredients list is not expired, then the process passes to block 182.

Block 182 depicts decrypting the ingredients list. Next, block 184 illustrates transmitting the decrypted ingredients list to an ingredients reservation list in association with the requesting customer; and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing distribution of electronic recipes, said method comprising the steps of:

encrypting a selection of ingredients of a particular electronic recipe accessible at a particular web site wherein said encrypted selection of ingredients are decryptable at a food retailer server system associated with a food retailer that intends to pre-package said encrypted selection of ingredients; and transmitting instructions for preparing said electronic recipe and said encrypted selection of ingredients to a computer system associated with a particular user, such that said particular electronic recipe is distributed to said particular user where said encrypted selection of ingredients is not accessible to said particular user.

2. The method for managing distribution of electronic recipes according to claim 1, said method further comprising the step of:

adjusting said particular electronic recipe for said particular user at said particular web site according to food preferences received for said particular user at said particular web site.

3. The method for managing distribution of electronic recipes according to claim 2, said step of adjusting said particular electronic recipe for said particular user according to food preferences further comprising the step of:

substituting ingredients in said particular electronic recipe.

4. The method for managing distribution of electronic recipes according to claim 2, said step of adjusting said particular electronic recipe for said particular user according to food preferences further comprising the step adjusting amounts of ingredients included in said particular electronic recipe.

5. The method for managing distribution of electronic recipes according to claim 1, said method further comprising the step of:

requiring registration of said particular user prior to enabling access to said particular electronic recipe.

6. The method for managing distribution of electronic recipes according to claim 1, said method further comprising the step of:

requiring electronic payment by said particular user prior to enabling access to said particular electronic recipe.

7. The method for managing distribution of electronic recipes according to claim 1, said method further comprising the steps of:

receiving a request for a decryption key for said encrypted selection of ingredients from a particular food retailer;

comparing said particular food retailer with a list of allowable food retailers; and only allowing access to said decryption key for said encrypted selection of ingredients to said particular food retailer in response to finding said particular food retailer in a plurality of allowable food retailers for said particular web site.

8. The method for managing distribution of electronic recipes according to claim 1, said step of encrypting a selection of ingredients of a particular electronic recipe accessible at a particular web site according to a particular user requesting said particular electronic recipe, further comprising the step of:

limiting a number of times that said encrypted selection of ingredients of said particular recipe is fillable for said particular user.

9. The method for managing distribution of electronic recipes according to claim 1, said step of transmitting instructions for preparing said electronic recipe and said encrypted selection of ingredients to a computer system associated with said particular user, further comprising the step of:

transmitting said instructions for preparing said electronic recipe and said encrypted selection of ingredients in an extensible mark-up language data format.

10. A system for managing distribution of electronic recipes, said system comprising:

means for encrypting a selection of ingredients of a particular electronic recipe accessible at a particular web site wherein said encrypted selection of ingredients are decryptable at a food retailer server system associated with a food retailer that intends to pre-package said encrypted selection of ingredients; and means for transmitting instructions for preparing said electronic recipe and said encrypted selection of ingredients to a computer system associated with a particular user, such that said particular electronic recipe is distributed to said particular user where said encrypted selection of ingredients is not accessible to said particular user.

11. The system for managing distribution of electronic recipes according to claim 10, said system further comprising:

means for adjusting said particular electronic recipe for said particular user at said particular web site according to food preferences received for said particular user at said particular web site.

12. The system for managing distribution of electronic recipes according to claim 11, said means for adjusting said particular electronic recipe for said particular user according to food preferences further comprising:

means for substituting ingredients in said particular electronic recipe.

13. The system for managing distribution of electronic recipes according to claim 11, said means for adjusting said particular electronic recipe for said particular user according to food preferences further comprising:

means for adjusting amounts of ingredients included in said particular electronic recipe.

14. The system for managing distribution of electronic recipes according to claim 10, said system further comprising:

means for requiring registration of said particular user prior to enabling access to said particular electronic recipe.

15. The system for managing distribution of electronic recipes according to claim 10, said system further comprising:

means for requiring electronic payment by said particular user prior to enabling access to said particular electronic recipe.

16. The system for managing distribution of electronic recipes according to claim 10, said system further comprising:

means for receiving a request for a decryption key for said encrypted selection of ingredients from a particular food retailer;

means for comparing said particular food retailer with a list of allowable food retailers; and means for only allowing access to said decryption key for said encrypted selection of ingredients to said particular food retailer in response to finding said particular food retailer in a plurality of allowable food retailers for said particular web site.

17. The system for managing distribution of electronic recipes according to claim 10, said means for encrypting a selection of ingredients of a particular electronic recipe accessible at a particular web site, further comprising:

means for limiting a number of times that said encrypted selection of ingredients of said particular recipe is fillable for said particular user.

18. The system for managing distribution of electronic recipes according to claim 10, said means for transmitting instructions for preparing said electronic recipe and said encrypted selection of ingredients to a computer system associated with said particular user, further comprising:

means for transmitting said instructions for preparing said electronic recipe and said encrypted selection of ingredients in an extensible mark-up language data format.

19. A program for managing distribution of electronic recipes, residing on a computer usable medium having computer readable program code means, said program comprising:

means for encrypting a selection of ingredients of a particular electronic recipe accessible at a particular web site wherein said encrypted selection of ingredients are decryptable at a food retailer server system associated with a food retailer that intends to pre-package said encrypted selection of ingredients; and means for transmitting instructions for preparing said electronic recipe and said encrypted selection of ingredients to a computer system associated with a particular user, such that said particular electronic recipe is distributed to said particular user where said encrypted selection of ingredients is not accessible to said particular user.

20. The program for managing distribution of electronic recipes according to claim 19, said program further comprising:

means for adjusting said particular electronic recipe for said particular user at said particular web site according to food preferences received for said particular user at said particular web site.

21. The program for managing distribution of electronic recipes according to claim 20, said program further comprising:

means for substituting ingredients in said particular electronic recipe.

22. The program for managing distribution of electronic recipes according to claim 20, said program further comprising:

means for adjusting amounts of ingredients included in said particular electronic recipe.

23. The program for managing distribution of electronic recipes according to claim 19, said program further comprising:

means for requiring registration of said particular user prior to enabling access to said particular electronic recipe.

24. The program for managing distribution of electronic recipes according to claim 19, said program further comprising:

means for requiring electronic payment by said particular user prior to enabling access to said particular electronic recipe.

25. The program for managing distribution of electronic recipes according to claim 19, said program further comprising:

means for receiving a request for a decryption key for said encrypted selection of ingredients from a particular food retailer;

means for comparing said particular food retailer with a list of allowable food retailers; and means for only allowing access to said decryption key for said encrypted selection of ingredients to said particular food retailer in response to finding said particular food retailer in a plurality of allowable food retailers for said particular web site.

26. The program for managing distribution of electronic recipes according to claim 19, said means for encrypting a selection of ingredients of a particular electronic recipe accessible at a particular web site, further comprising:

means for limiting a number of times that said encrypted selection of ingredients of said particular recipe is fillable for said particular user.

27. The program for managing distribution of electronic recipes according to claim 19, said program further comprising:

means for transmitting said instructions for preparing said electronic recipe and said encrypted selection of ingredients in an extensible mark-up language data format.

28. A method for managing preparation for an electronic recipe, said method comprising the steps of:

receiving a particular recipe with instructions for preparing said particular recipe and encrypted ingredients for said particular recipe from a particular web site at a computer system associated with a particular user; and transmitting said encrypted ingredients to a particular food retailer server system that is enabled to decrypt said ingredients and pre-package said decrypted ingredients, such that said computer system manages requests for preparation of encrypted ingredients of an electronic recipe.

29. The method for managing preparation for an electronic recipe according to claim 28, said method further comprising the step of:

searching from a plurality of food retailer server systems for a food retailer that is enabled to decrypt said ingredients and pre-package said decrypted ingredients.

30. The method for managing preparation for an electronic recipe according to claim 28, said step of transmitting said encrypted ingredients to a particular food retailer server system further comprising the steps of:

adding said particular recipe to an electronic schedule for preparation; and transmitting said encrypted ingredients to said particular food retailer server system according to said electronic schedule.

31. The method for managing preparation for an electronic recipe according to claim 28, said method further comprising the step of:

transmitting cooking instructions for said particular electronic recipe from said computer system to a particular cooking device that will cook said dish prepared from said particular electronic recipe.

32. The method for managing preparation for an electronic recipe according to claim 28, said method further comprising the step of:

transmitting food preferences for said particular user to said particular web site such that said particular recipe is specified for said particular user prior to transmittal from said particular web site to said computer system.

33. A system for managing preparation for an electronic recipe, said system comprising:

means for receiving a particular recipe with instructions for preparing said particular recipe and encrypted ingredients for a particular user for said particular recipe from a particular web site at a computer system associated with said particular user; and means for transmitting said encrypted ingredients to a particular food retailer server system that is enabled to decrypt said ingredients and pre-package said decrypted ingredients, such that said computer system manages requests for preparation of encrypted ingredients of an electronic recipe.

34. The system for managing preparation for an electronic recipe according to claim 33, said system further comprising:

means for searching from a plurality of food retailer server systems for a food retailer that is enabled to decrypt said ingredients and pre-package said decrypted ingredients.

35. The system for managing preparation for an electronic recipe according to claim 33, said means for transmitting said encrypted ingredients to a particular food retailer server system further comprising the steps of:

means for adding said particular recipe to an electronic schedule for preparation; and means for transmitting said encrypted ingredients to said particular food retailer server system according to said electronic schedule.

36. The system for managing preparation for an electronic recipe according to claim 33, said system further comprising:

means for transmitting cooking instructions for said particular electronic recipe from said computer system to a particular cooking device that will cook said dish prepared from said particular electronic recipe.

37. The system for managing preparation for an electronic recipe according to claim 33, said system further comprising:

means for transmitting food preferences for said particular user to said particular web site such that said particular recipe is specified for said particular user prior to transmittal from said particular web site to said computer system.

38. A method for managing preparation of a portion of a recipe, said method comprising the steps of:

receiving encrypted ingredients at a particular food retailer server system from a particular user for a recipe provided by a particular web site;

decrypting said encrypted ingredients with a decryption key received from said particular web site;

controlling pre-packaging of said decrypted ingredients at said particular food retailer for said particular user, such that said particular food retailer manages preparation of encrypted ingredients for a particular user.

39. The method for managing preparation of a portion of a recipe according to claim 38, said method further comprising the step of:

transmitting a request for said decryption key to said particular web site.

40. A system for managing preparation of a portion of a recipe, said system comprising:

means for receiving encrypted ingredients at a particular food retailer server system from a particular user for a recipe provided by a particular web site;

means for decrypting said encrypted ingredients with a decryption key received from said particular web site;

means for controlling pre-packaging of said decrypted ingredients at said particular food retailer for said particular user, such that said particular food retailer manages preparation of encrypted ingredients for a particular user.

41. The system for managing preparation of encrypted ingredients according to claim 40, said system further comprising:

means for transmitting a request for said decryption key to said particular web site.

42. A program for managing preparation of a portion of a recipe, residing on a computer usable medium having computer readable program code means, said program comprising:
   means for receiving encrypted ingredients at a particular food retailer server system from a particular user for a recipe provided by a particular web site;
   means for decrypting said encrypted ingredients with a decryption key received from said particular web site;
   means for controlling pre-packaging of said decrypted ingredients at said particular food retailer for said particular user, such that said particular food retailer manages preparation of encrypted ingredients for a particular user.

43. The program for managing preparation of encrypted ingredients according 42, said program further comprising:
   means for transmitting a request for said decryption key to said particular web site.

* * * * *